(12) United States Patent
Cheng

(10) Patent No.: US 11,428,400 B1
(45) Date of Patent: Aug. 30, 2022

(54) LIGHT SOURCE MODULE

(71) Applicant: E Ink Holdings Inc., Hsinchu (TW)

(72) Inventor: Chao-Chun Cheng, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/460,288

(22) Filed: Aug. 29, 2021

(30) Foreign Application Priority Data

Jun. 3, 2021 (TW) .................... 110120125

(51) Int. Cl.
  *F21V 31/04* (2006.01)
  *F21Y 115/10* (2016.01)

(52) U.S. Cl.
  CPC ........... *F21V 31/04* (2013.01); *F21Y 2115/10* (2016.08)

(58) Field of Classification Search
  CPC .. G02B 6/0021; G02B 6/0073; G02B 6/0066; G02B 6/3644; G02B 6/4204; G02B 6/4212
  See application file for complete search history.

(56) References Cited

U.S. PATENT DOCUMENTS

| | | | |
|---|---|---|---|
| 10,129,994 B1 * | 11/2018 | Sulem | H05K 5/065 |
| 10,288,800 B1 | 5/2019 | Keranen et al. | |
| 2003/0091820 A1 * | 5/2003 | Robbins | G02B 6/4202 |
| | | | 428/373 |
| 2005/0174806 A1 * | 8/2005 | Sakai | G02B 6/0013 |
| | | | 362/615 |
| 2009/0141476 A1 | 6/2009 | Meir et al. | |
| 2010/0002414 A1 | 1/2010 | Meir et al. | |
| 2011/0149594 A1 * | 6/2011 | Terajima | G02B 6/0021 |
| | | | 362/606 |
| 2012/0051093 A1 | 3/2012 | Kanade et al. | |
| 2019/0146136 A1 | 5/2019 | Kakkar et al. | |
| 2020/0110212 A1 | 4/2020 | Yamane et al. | |

FOREIGN PATENT DOCUMENTS

| CN | 212178611 | 12/2020 |
|---|---|---|
| TW | 202114199 | 4/2021 |

OTHER PUBLICATIONS

"Office Action of Taiwan Counterpart Application", dated Dec. 30, 2021, p. 1-p. 5.

* cited by examiner

*Primary Examiner* — William J Carter
(74) *Attorney, Agent, or Firm* — JCIPRNET

(57) ABSTRACT

A light source module, including a circuit board, a light-emitting element, a light-guiding plate, a first waterproof layer, a second waterproof layer, and a third waterproof layer, is provided. The light-emitting element is configured on the circuit board. The light-guiding plate includes at least one through hole. The circuit board is configured on a first surface of the light guide plate so that the light-emitting element inserts into the at least one through hole. The first waterproof layer is located on a second surface of the light-guiding plate that is opposite to the first surface, and covers the at least one through hole. The second waterproof layer is located between the first surface and the circuit board. The third waterproof layer is located between the second surface and the first waterproof layer.

9 Claims, 7 Drawing Sheets

LIGHT SOURCE MODULE

CROSS-REFERENCE TO RELATED APPLICATION

This application claims the priority benefit of Taiwan application serial no. 110120125, filed on Jun. 3, 2021. The entirety of the above-mentioned patent application is hereby incorporated by reference herein and made a part of this specification.

BACKGROUND

Technical Field

This disclosure relates to an optical module, and in particular to a light source module.

Description of Related Art

In general, in order to prevent a light-emitting element from being damaged by moisture in a light source module, a waterproof material is used to fill the gaps around the light-emitting element. Since an interface between the light-emitting element and the surrounding components is complicated, and a selected waterproof material has to conform to material characteristics of the surrounding components, the selection of the waterproof material is not easy and often requires a variety of waterproof materials to implement. However, the thermal expansion and contraction characteristics of the different waterproof materials are different. Under severe temperature and humidity conditions, gaps between the different materials are likely to occur, which may reduce the waterproof performance.

SUMMARY

This disclosure provides a light source module, which has good waterproof performance and stability.

The light source module of the disclosure includes a circuit board, a light-emitting element, a light-guiding plate, a first waterproof layer, a second waterproof layer, and a third waterproof layer. The light-emitting element is configured on the circuit board. The light-guiding plate includes at least one through hole. The circuit board is configured on a first surface of the light-guiding plate so that the light-emitting element inserts into the at least one through hole. The first waterproof layer is located on a second surface of the light-guiding plate that is opposite to the first surface, and covers the at least one through hole. The second waterproof layer is located between the first surface and the circuit board. The third waterproof layer is located between the second surface and the first waterproof layer.

In an embodiment of the disclosure, the second waterproof layer is disposed along the at least one through hole as a closed ring, and the third waterproof layer is disposed along the at least one through hole as a closed ring.

In an embodiment of the disclosure, the light source module may also include a colloid, which fills the at least one through hole, so as to wrap around the light-emitting element.

In an embodiment of the disclosure, the first waterproof layer, the second waterproof layer, the third waterproof layer, the circuit board and the light-guiding plate form an enclosed space, and the through hole is located in the enclosed space.

In an embodiment of the disclosure, the light-emitting element includes multiple light-emitting diodes.

In an embodiment of the disclosure, the light-guiding plate includes multiple through holes, and the multiple through holes respectively accommodate the multiple light-emitting diodes.

In an embodiment of the disclosure, at least one of the second waterproof layer and the third waterproof layer is disposed along a circumference of each of the multiple through holes as a closed ring.

In an embodiment of the disclosure, materials of the second waterproof layer and the third waterproof layer include foam lock glue, moisture-curing waterproof glue, heat-curing waterproof glue, light-curing waterproof glue, or waterproof double-sided glue.

In an embodiment of the disclosure, a material of the first waterproof layer is a material with water resistance and light absorption properties.

In an embodiment of the disclosure, a material of the first waterproof layer includes polyethylene terephthalate.

Based on the above, the light source module of the disclosure may reduce the complexity of the interface between the light-emitting element and the surrounding components by inserting the light-emitting element into the through hole of the light-guiding plate, thereby enabling fewer types of waterproof layers to isolate the light-emitting element from the water, so that the light source module has good waterproof performance and stability.

To make the above features and advantages more comprehensible, several embodiments accompanied by drawings are described in detail as follows.

DESCRIPTION OF THE EMBODIMENTS

Figure 1:
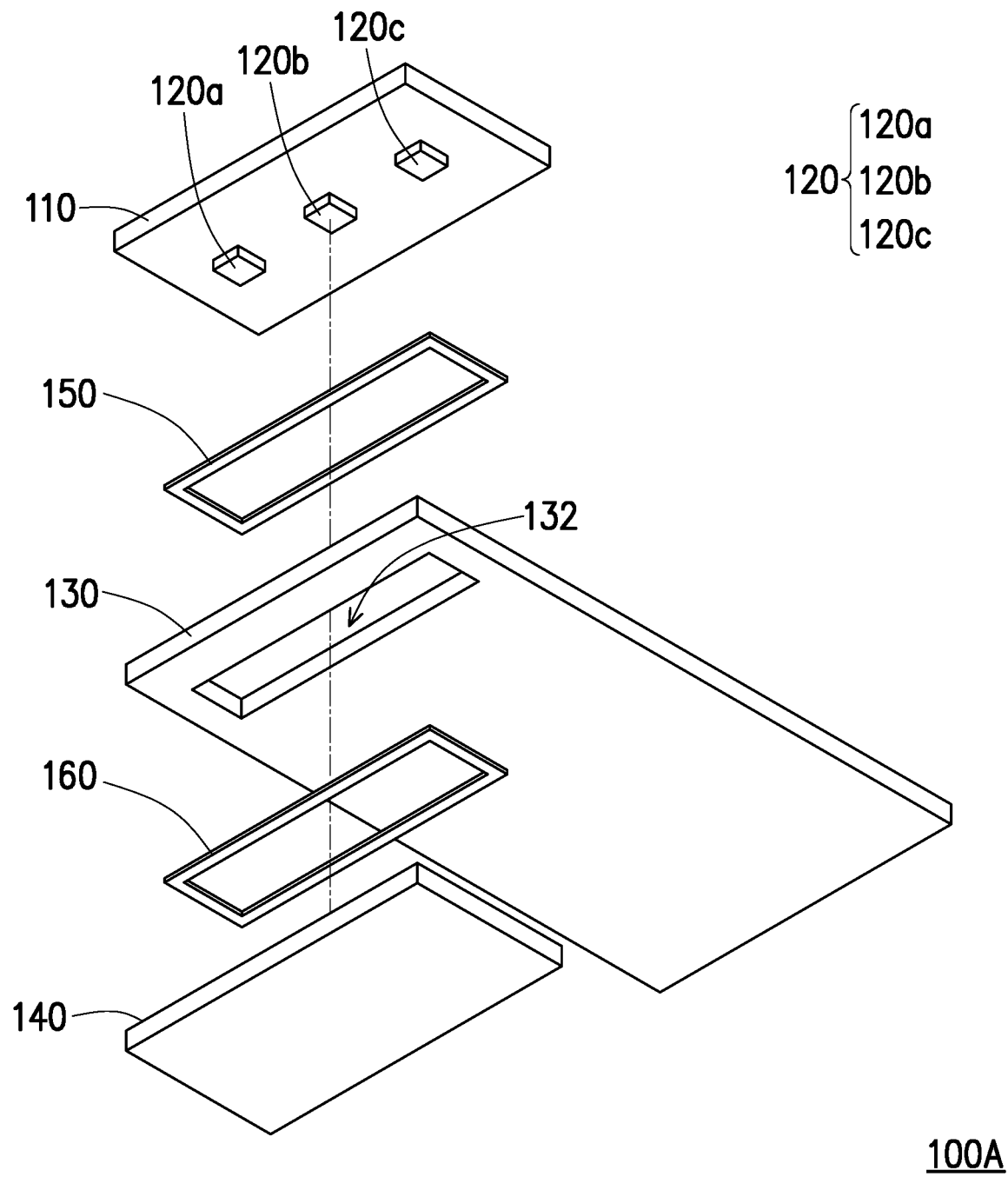
FIG. 1 is an exploded schematic view of a light source module according to a first embodiment of the disclosure.

Directional terms mentioned in this text, such as "up", "down", "front", "back", "left", "right", are only directions with reference to the drawings. Therefore, the directional terms used are for illustrative purposes, and are not intended to limit the disclosure.

In the drawings, each drawing depicts the general features of the methods, structures, and/or materials used in a specific embodiment. However, the drawings should not be construed as defining or limiting the scope or nature covered by the embodiments. For example, the relative size, thickness, and position of each layer, region, and/or structure may be reduced or enlarged for clarity.

In the following embodiments, the same or similar elements use the same or similar reference numerals, and redundant descriptions are omitted. In addition, the features in the different embodiments may be combined without conflict, and simple equivalent changes and modifications made in accordance with this specification or the scope of the patent application still fall within the scope of this patent.

Terms such as "first" and "second" mentioned in the specification or the scope of the patent application are only intended to name discrete elements or to distinguish between different embodiments or ranges, and are not intended to limit an upper limit or a lower limit of the number of elements, and are also not intended to limit a manufacturing order, or a disposition order of the elements. In addition, disposition of one element/film layer on (or above) another element/film layer may encompass the element/film layer being directly disposed on (or above) the other element/film layer, and the two elements/film layers are in direct contact with each other, and the element/film layer being indirectly disposed on (or above) the other element/film layer, and there are one or more elements/film layers between the two elements/film layers.

Figure 2:
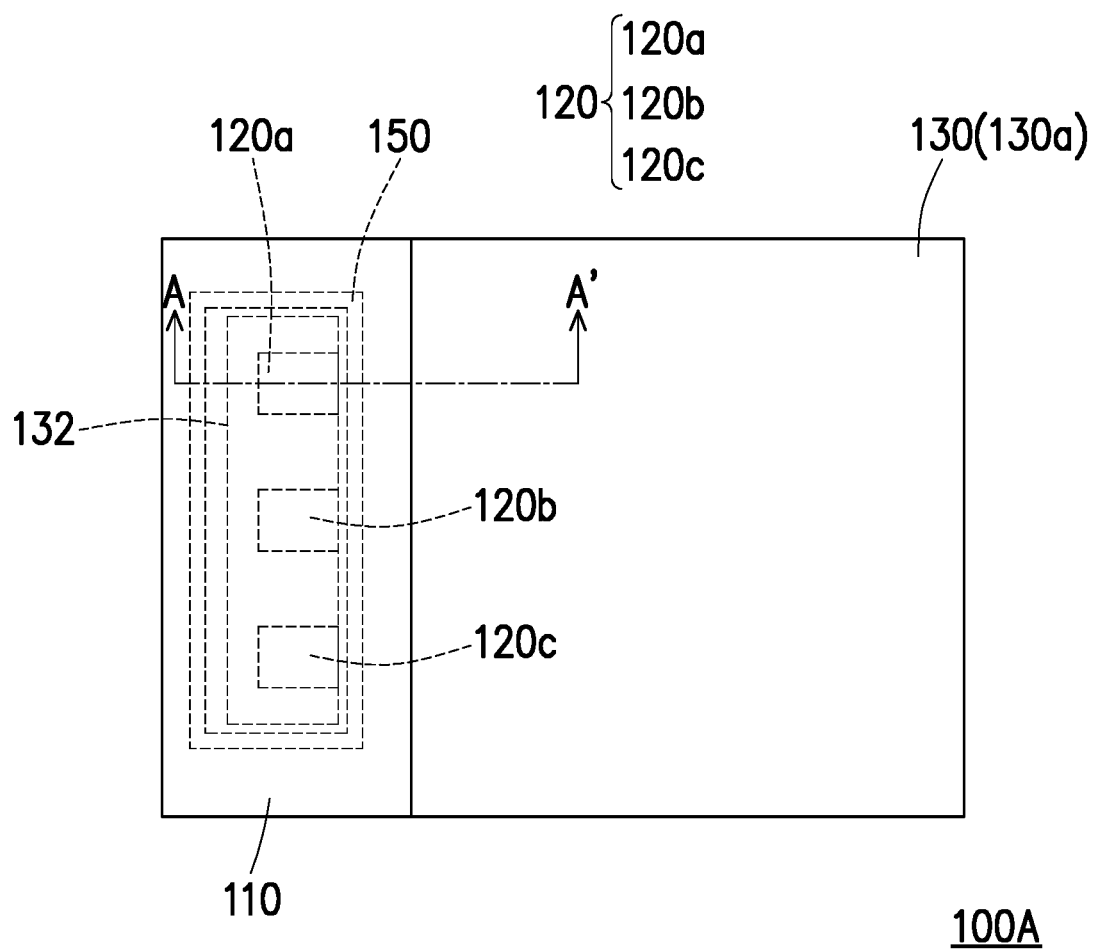
FIG. 2 is a schematic top view of the light source module according to the first embodiment of the disclosure.
Figure 3:
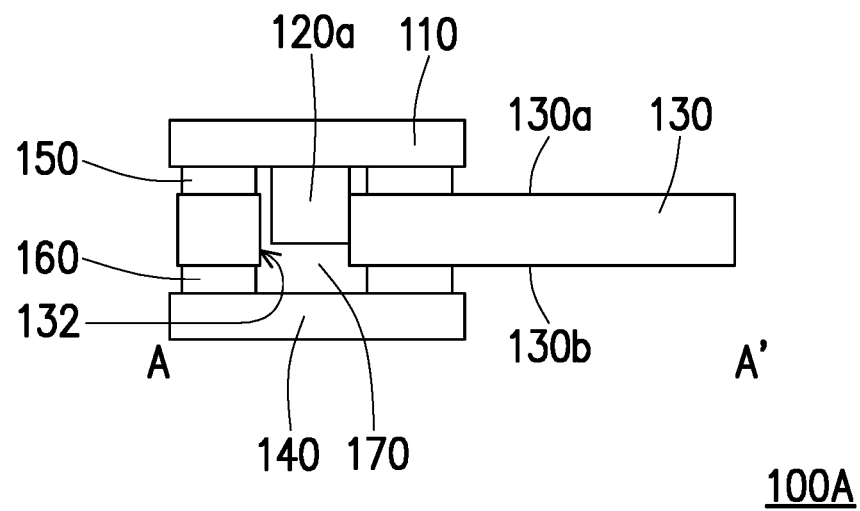
FIG. 3 is a schematic cross-sectional view of the light source module according to the first embodiment of the disclosure.

FIG. 1 is an exploded schematic view of a light source module according to a first embodiment of the disclosure. FIG. 2 is a schematic top view of the light source module according to the first embodiment of the disclosure. FIG. 3 is a schematic cross-sectional view of the light source module according to the first embodiment of the disclosure. FIG. 3 may correspond to a position of a line A-A' in FIG. 2. For clarity of illustration, FIG. 2 omits some components, and reference may be made to FIG. 1 or 3 for the omitted parts.

With reference to FIGS. 1 to 3, a light source module 100A includes a circuit board 110, a light-emitting element 120, a light-guiding plate 130, a first waterproof layer 140, a second waterproof layer 150, and a third waterproof layer 160. The light-emitting element 120 is configured on the circuit board 110. The light-guiding plate 130 includes at least one through hole 132, but the disclosure is not limited thereto. In the embodiment, the light-guiding plate 130 includes a single through hole 132. However, in other embodiments, the light-guiding plate 130 may include multiple through holes 132. The light-guiding plate 130 has a first surface 130a and a second surface 130b opposite to the first surface 130a. The circuit board 110 is configured on the first surface 130a of the light-guiding plate 130, so that the light-emitting element 120 inserts into the through hole 132. The first waterproof layer 140 is located on the second surface 130b of the light-guiding plate 130 and covers the through hole 132. The second waterproof layer 150 is located between the first surface 130a and the circuit board 110. The third waterproof layer 160 is located between the second surface 130b and the first waterproof layer 140. The through hole 132 is a hole penetrating the light-guiding plate 130. It is easier to make a through hole in the light-guiding plate than just digging a trench (without penetrating the light-guiding plate) in the light-guiding plate.

In some embodiments, the circuit board 110 may be a flexible printed circuit board (FPC) or a rigid printed circuit board (PCB), but the disclosure is not limited thereto.

In some embodiments, the light-emitting element 120 may include multiple light-emitting diodes 120a, 120b, and 120c, but the disclosure is not limited thereto. The light-emitting element 120 may be top-emitting or side-emitting element, but the disclosure is not limited thereto.

A material of the light-guiding plate 130 may include glass, polycarbonate (PC), poly(methyl methacrylate) (PMMA), or other suitable organic or inorganic materials, but the disclosure is not limited thereto.

The through hole 132 of the light-guiding plate 130 may accommodate the multiple light-emitting diodes 120a, 120b, and 120c, but the disclosure is not limited thereto. The through hole 132 may be formed by a punching process, a CNC (computer numerical control) process, or laser cutting. The disclosure does not limit the shape of the through hole 132, as long as the light-emitting element 120 may be inserted into the through hole 132.

A material of the first waterproof layer 140 may be a material with water resistance and light absorption, such as polyethylene terephthalate (PET), but the disclosure is not limited thereto. The disclosure does not limit the size of the first waterproof layer 140, as long as it may completely cover the through hole 132. For example, an area of the first waterproof layer 140 may be the same as an area of the third waterproof layer 160 or an area of the light-guiding plate 130.

A material of the second waterproof layer 150 and a material of the third waterproof layer 160 may include foam lock glue, moisture-curing waterproof glue, heat-curing waterproof glue, light-curing waterproof glue, or waterproof double-sided glue, such as VHB series tape by 3M, poly (methyl methacrylate) (PMMA), polyurethane (PU), or silicone resin based waterproof glue, or other waterproof adhesives, but the disclosure is not limited thereto. The material of the second waterproof layer 150 and the material of the third waterproof layer 160 may be the same or different, and the disclosure is not limited thereto.

The second waterproof layer 150 is disposed along the through hole 132 as a closed ring, so as to seal a gap between the circuit board 110 and the light-guiding plate 130. The third waterproof layer 160 is disposed along the through hole 132 as a closed ring, so as to seal a gap between the first waterproof layer 140 and the light-guiding plate 130. That is, one end of the through hole 132 is surrounded by the second waterproof layer 150, and another end is surrounded by the third waterproof layer 160.

In some embodiments, the first waterproof layer 140, the second waterproof layer 150, the third waterproof layer 160, the circuit board 110, and the light-guiding plate 130 may form an enclosed space 170, and the through hole 132 may be located in the enclosed space 170. In other words, the light-emitting element 120 may also be located in the enclosed space 170, so that the light-emitting element 120 may be isolated from water, so as to reduce a risk of damaging the light-emitting element.

In some embodiments, the light source module 100A may further include a colloid (not shown), which fills the through hole 132, so as to wrap around the light-emitting element 120. A material of the colloid includes optical clear resin (OCR), but the disclosure is not limited thereto. From another perspective, the colloid may be located in the enclosed space 170 and wrap around the light-emitting element 120, so as to isolate the light-emitting element 120 from water, achieve a good waterproof effect, and reduce the risk of damaging the light-emitting element.

Since the light-emitting element 120 may be inserted into the through hole 132 of the light-guiding plate 130, the light-guiding plate 130 becomes the main component around the light-emitting element 120, which reduces complexity of an interface between the light-emitting element 120 and the surrounding components, thereby allowing the light-emitting element 120 to be isolated from water by fewer types of waterproof layers (that is, the first waterproof layer 140, the second waterproof layer 150, and the third waterproof layer 160), so that waterproof performance of the light source module 100A has better stability.

Figure 4:
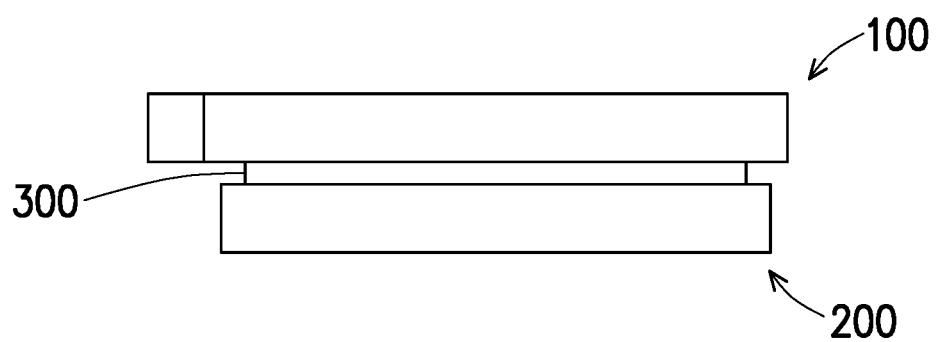
FIG. 4 is a schematic view of an exemplary application of the light source module according to the first embodiment of the disclosure.

FIG. 4 is a schematic view of an exemplary application of the light source module according to the first embodiment of the disclosure.

With reference to FIG. 4, in an exemplary application of the light source module 100A, it may be a part of a display 10. Furthermore, the light source module 100A may be a part of a light source module 100 in the display 10. The display 10 is, for example, a reflective display, which includes the light source module 100, a display module 200, and an adhesive layer 300 between the light source module 100 and the display module 200. The light source module 100 may be a front light source module, and the display module 200 is, for example, a reflective display module, but the disclosure is not limited to this.

In some embodiments, the light-guiding plate 130 of the light source module 100A may be bonded to the display module 200 by the adhesive layer 300, so as to form the display 10.

Figure 5:
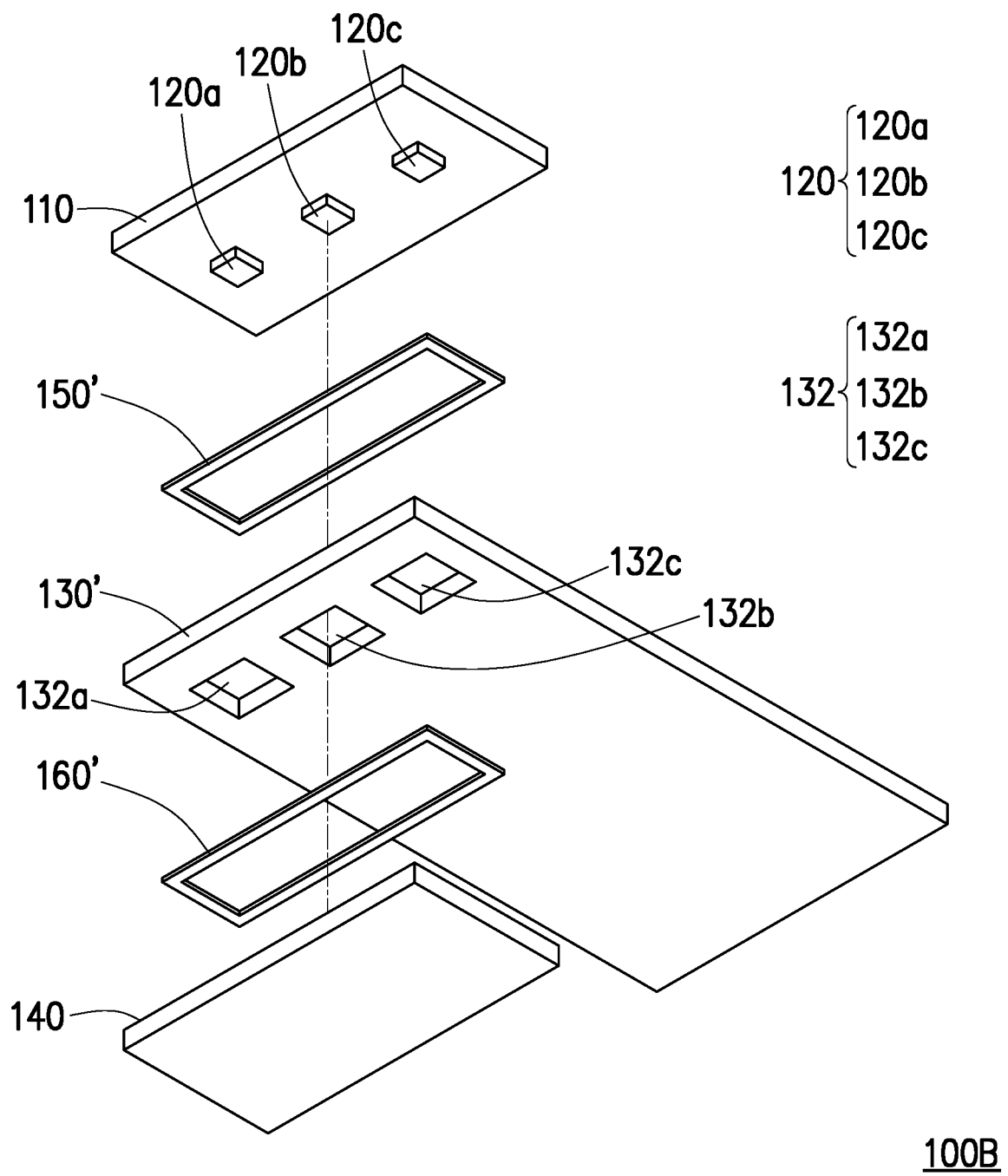
FIG. 5 is an exploded schematic view of a light source module according to a second embodiment of the disclosure.
Figure 6:
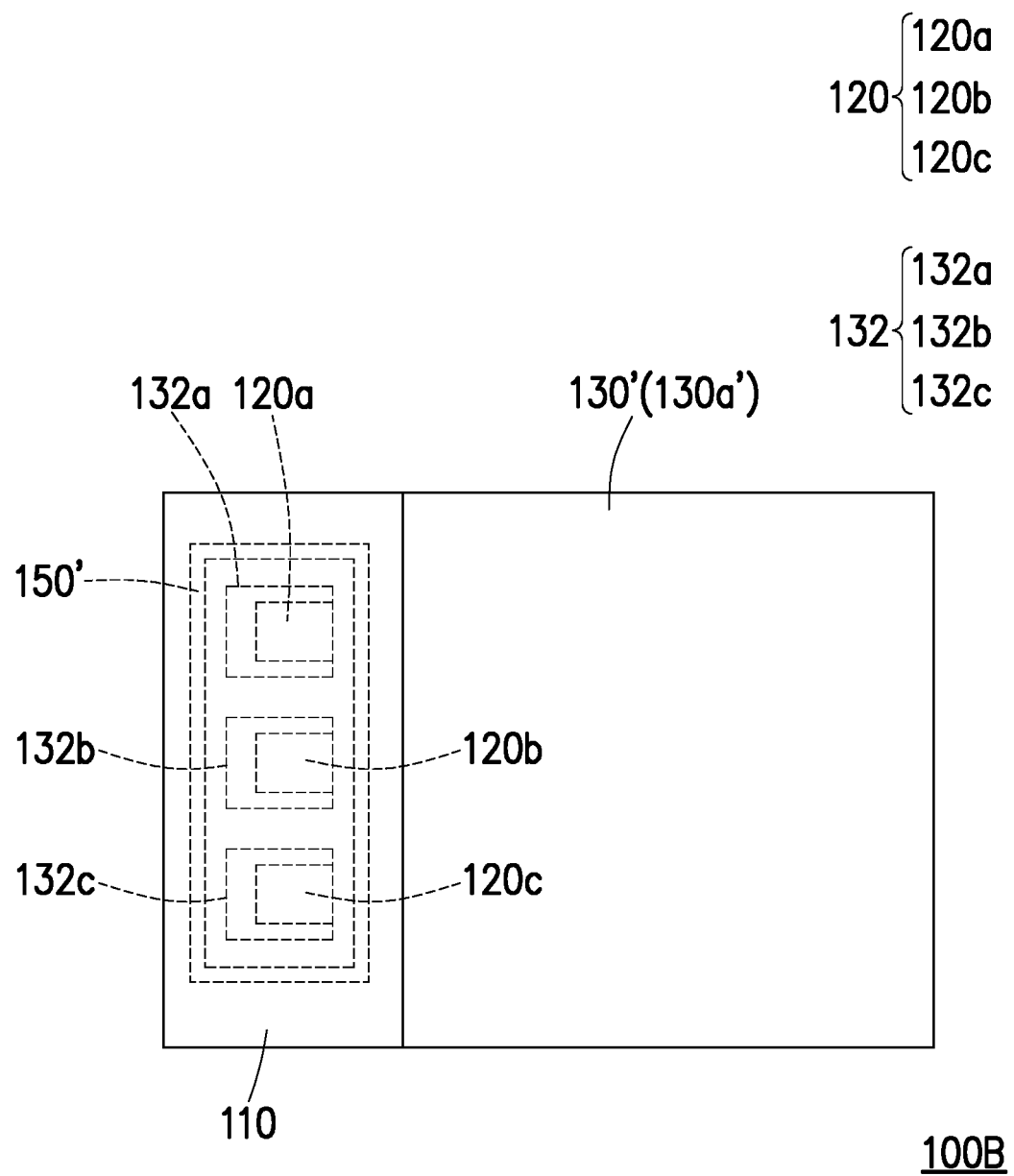
FIG. 6 is a schematic top view of the light source module according to the second embodiment of the disclosure.

FIG. 5 is an exploded schematic view of a light source module according to a second embodiment of the disclosure. FIG. 6 is a schematic top view of the light source module according to the second embodiment of the disclosure. The exploded schematic view in FIG. 5 is roughly similar to the exploded schematic view in FIG. 1, and the top schematic view in FIG. 6 is roughly similar to the top schematic view in FIG. 2. Therefore, the same components described in the two embodiments are represented by the same reference numerals and have similar functions, materials, or formation means, and reference may be made to the foregoing content, which are not repeated here. For clarity of illustration, FIG. 6 omits some components, and reference may be made to FIG. 5 for the omitted parts.

With reference to FIGS. 5 and 6, a light source module 100B includes the circuit board 110, the light-emitting element 120, a light-guiding plate 130', the first waterproof layer 140, a second waterproof layer 150', and a third waterproof layer 160'. The light-emitting element 120 is configured on the circuit board 110, and it may include the multiple light-emitting diodes 120a, 120b, and 120c, but the disclosure is not limited thereto. The light-guiding plate 130' includes the at least one through hole 132, but the disclosure is not limited thereto. The light-guiding plate 130' has a first surface 130a' and the second surface (not labeled, similar to the second surface 130b in FIG. 3) opposite to the first surface 130a', and the circuit board 110 is disposed on the first surface 130a' of the light-guiding plate 130' to enable the light-emitting element 120 to insert into the through hole 132. The first waterproof layer 140 is located on the second surface of the light-guiding plate 130' and covers the through hole 132. The second waterproof layer 150' is located between the first surface 130a' and the circuit board 110, and the third waterproof layer 160' is located between the second surface and the first waterproof layer 140.

In FIGS. 5 and 6, the light source module 100B of the embodiment is different from the first embodiment in that the light-guiding plate 130' of the light source module 100B has multiple through holes 132 (for example, through holes 132a, 132b, and 132c). The multiple through holes 132a, 132b, and 132c may respectively accommodate the multiple light-emitting diodes 120a, 120b, and 120c. For example, the through hole 132a may correspondingly accommodate the light-emitting diode 120a, the through hole 132b may correspondingly accommodate the light-emitting diode 120b, and the through hole 132c may correspondingly accommodate the light-emitting diode 120c.

In the embodiment, the second waterproof layer 150' is disposed along the through hole 132 as a closed ring, and it surrounds the multiple through holes 132a, 132b, 132c near one end of the circuit board 110, so as to seal a gap between the circuit board 110 and the light-guiding plate 130'. The third waterproof layer 160' is disposed along the through hole 132 as a closed ring, and it surrounds the multiple through holes 132a, 132b, and 132c near one end of the first waterproof layer 140, so as to seal a gap between the first waterproof layer 140 and the light-guiding plate 130'.

In some embodiments, the light source module 100B may also be applied to the display 10 in FIG. 4, but the disclosure is not limited thereto. Furthermore, the light source module 100B may be a part of the light source module 100 in the display 10, but the disclosure is not limited to this.

Figure 7:
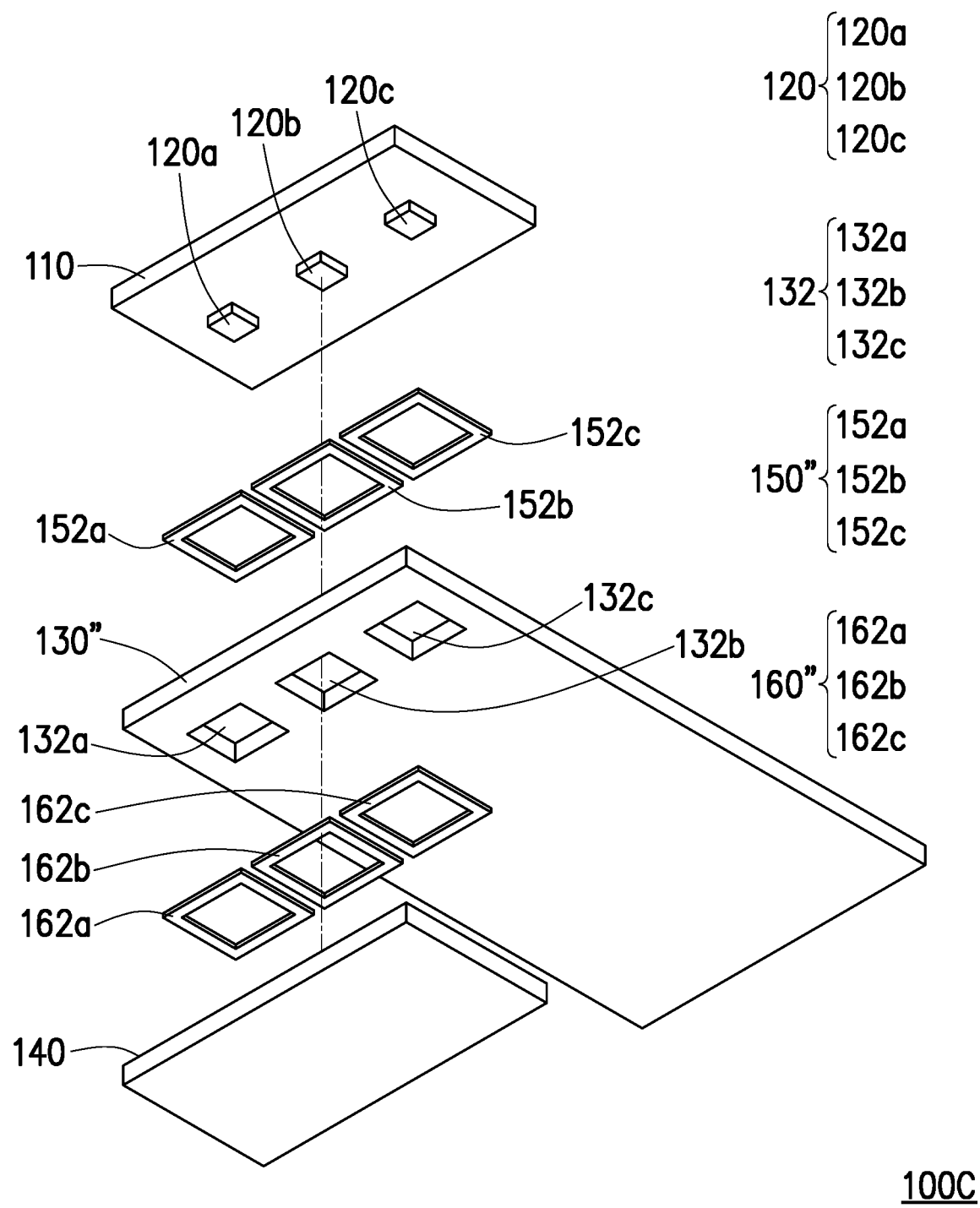
FIG. 7 is an exploded schematic view of a light source module according to a third embodiment of the disclosure.
Figure 8:
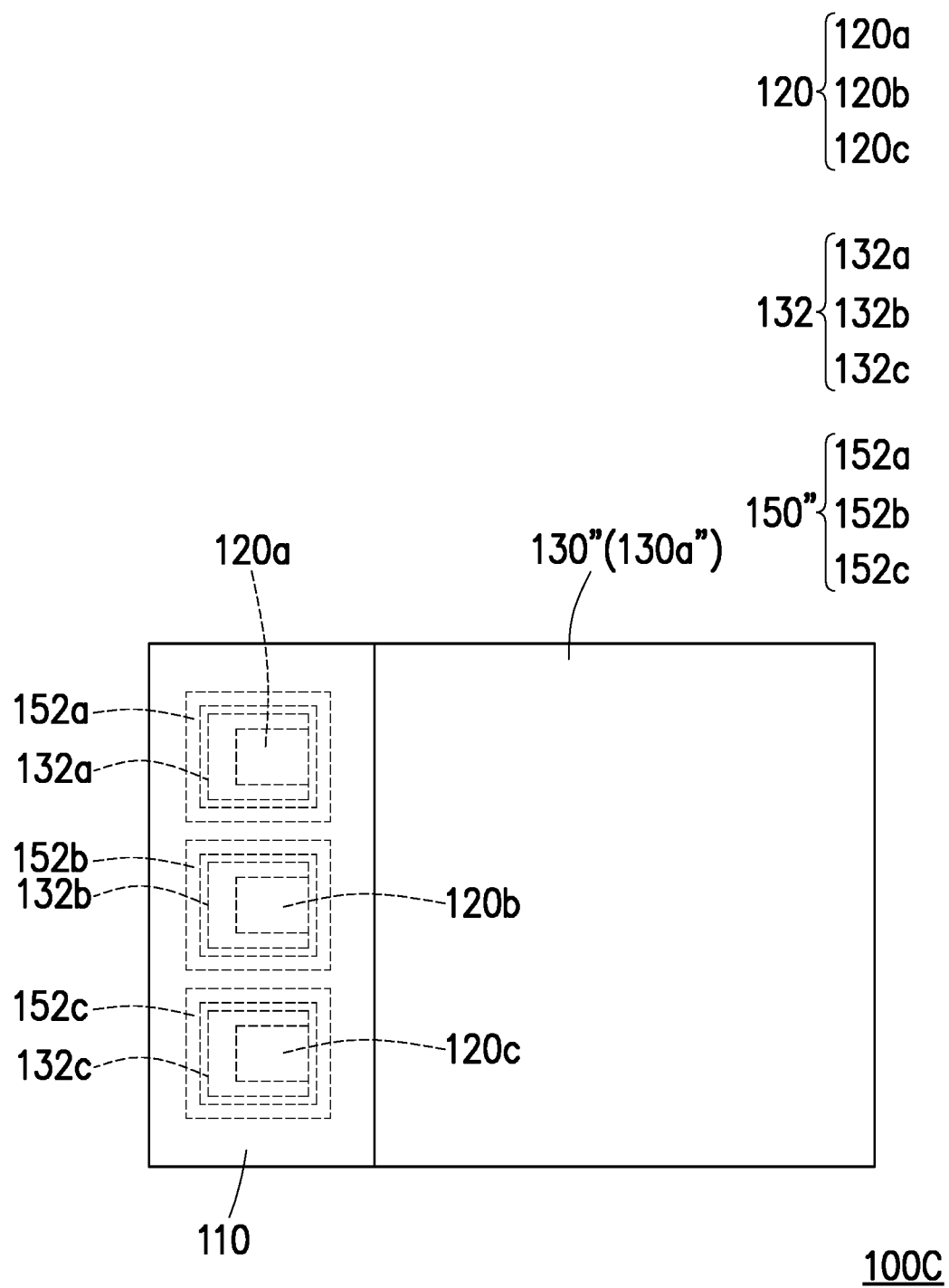
FIG. 8 is a schematic top view of the light source module according to the third embodiment of the disclosure.

FIG. 7 is an exploded schematic view of a light source module according to a third embodiment of the disclosure. FIG. 8 is a schematic top view of the light source module according to the third embodiment of the disclosure. The exploded schematic view in FIG. 7 is roughly similar to the exploded schematic view in FIG. 5, and the top schematic view in FIG. 8 is roughly similar to the top schematic view in FIG. 6. Therefore, the same components described in the two embodiments are represented by the same reference numerals and have similar functions, materials, or formation means, and reference may be made to the foregoing content, which are not repeated here. For clarity of illustration, FIG. 8 omits some components, and reference may be made to FIG. 7 for the omitted parts.

With reference to FIGS. 7 and 8, a light source module 100C includes the circuit board 110, the light-emitting element 120, a light-guiding plate 130", the first waterproof layer 140, a second waterproof layer 150", and a third waterproof layer 160". The light-emitting element 120 is configured on the circuit board 110, and it may include the multiple light-emitting diodes 120a, 120b, and 120c, but the disclosure is not limited thereto. The light-guiding plate 130" includes the multiple through holes 132 (for example, the through holes 132a, 132b, and 132c), but the disclosure is not limited thereto. The light-guiding plate 130" has a first surface 130a" and the second surface (not labeled, similar to the second surface 130b in FIG. 3) opposite to the first surface 130a", and the circuit board 110 is disposed on the first surface 130a" of the light-guiding plate 130" to enable the light-emitting element 120 to insert into the through hole 132. The first waterproof layer 140 is located on the second surface of the light-guiding plate 130" and covers the through hole 132. The second waterproof layer 150" is located between the first surface 130a" and the circuit board 110, and the third waterproof layer 160" is located between the second surface and the first waterproof layer 140.

In FIGS. 7 and 8, the light source module 100C of the embodiment is different from the second embodiment in that at least one of the second waterproof layer 150" and the third waterproof layer 160" of the light source module 100C is disposed along a circumference of each of the multiple through holes 132a, 132b, and 132c. For example, the second waterproof layer 150" may be disposed along the circumference of the through hole 132a as a closed ring waterproof layer 152a, along the circumference of the through hole 132b as a closed ring waterproof layer 152b, and along the circumference of the through hole 132c as a closed ring waterproof layer 152b. In other words, the second waterproof layer 150" may include the multiple closed ring waterproof layers 152a, 152b, and 152c, so as to seal a gap between the circuit board 110 and the light-guiding plate 130". Alternatively, the third waterproof layer 160" may also be disposed along the circumference of the through hole 132a as a closed ring waterproof layer 162a, along the circumference of the through hole 132b as a closed ring waterproof layer 162b, and along the circumference of the through hole 132c as a closed ring waterproof layer 162c. In other words, the third waterproof layer 160" may include the multiple closed ring waterproof layers 162a, 162b, and 162c, so as to seal a gap between the first waterproof layer 140 and the light-guiding plate 130".

In some embodiments, the number of closed ring waterproof layers of the second waterproof layer 150" corresponds to the number of through holes 132, but the disclosure is not limited thereto.

In some embodiments, the number of closed ring waterproof layers of the third waterproof layer 160" corresponds to the number of through holes 132, but the disclosure is not limited thereto.

It should be understood that the second waterproof layer 150" may be a single closed ring waterproof layer as shown in the second embodiment or multiple closed ring waterproof layers as shown in the third embodiment, while the third waterproof layer 160" may be a single closed ring waterproof layer as shown in the second embodiment or multiple closed ring waterproof layers as shown in the third embodiment, and are not limited by the disclosure. Disposition means of the second waterproof layer 150" and the third waterproof layer 160" may be adjusted according to requirements. For example, in some embodiments, the second waterproof layer 150" is a single closed ring waterproof layer while the third waterproof layer 160" is multiple closed ring waterproof layers. In other embodiments, the second waterproof layer 150" is multiple closed ring waterproof layers while the third waterproof layer 160" is a single closed ring waterproof layer, but the disclosure is not limited thereto.

In some embodiments, the light source module 100C may also be applied to the display 10 in FIG. 4, but the disclosure is not limited thereto. Furthermore, the light source module 100C may be a part of the light source module 100 in the display 10, but the disclosure is not limited to this.

In summary, the light source module of the disclosure may reduce the complexity of the interface between the light-emitting element and the surrounding components by inserting the light-emitting element into the through hole of the light-guiding plate, thereby enabling fewer types of waterproof layers to isolate the light-emitting element from the water, so that the light source module has good waterproof performance and stability.

Although the disclosure has been described with reference to the above-mentioned embodiments, they are not intended to limit the disclosure. It is apparent that any one of ordinary skill in the art may make changes and modifications to the described embodiments without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. A light source module, comprising:
   a circuit board;
   a light-emitting element, configured on the circuit board;
   a light-guiding plate, comprising at least one through hole, wherein the circuit board is configured on a first surface of the light-guiding plate so that the light-emitting element inserts into the at least one through hole;
   a first waterproof layer, located on a second surface of the light-guiding plate that is opposite to the first surface, and covers the at least one through hole;
   a second waterproof layer, located between the first surface and the circuit board; and
   a third waterproof layer, located between the second surface and the first waterproof layer, wherein the second waterproof layer is disposed along the at least one through hole as a closed ring, and the third waterproof layer is disposed along the at least one through hole as a closed ring.

2. The light source module according to claim 1, further comprising:
   a colloid, filling the at least one through hole, so as to wrap around the light-emitting element.

3. The light source module according to claim 1, wherein the first waterproof layer, the second waterproof layer, the third waterproof layer, the circuit board, and the light-guiding plate form an enclosed space, and the at least one through hole is located inside the enclosed space.

4. The light source module according to claim 1, wherein the light-emitting element comprises a plurality of light-emitting diodes.

5. The light source module according to claim 4, wherein the light-guiding plate comprises a plurality of through holes, and the plurality of through holes respectively accommodate the plurality of light-emitting diodes.

6. The light source module according to claim 5, wherein at least one of the second waterproof layer and the third waterproof layer is disposed along a circumference of each of the plurality of through holes as a closed ring.

7. The light source module according to claim 1, wherein materials of the second waterproof layer and the third waterproof layer comprises foam lock glue, moisture-curing waterproof glue, heat-curing waterproof glue, light-curing waterproof glue, or waterproof double-sided glue.

8. The light source module according to claim 1, wherein a material of the first waterproof layer is a material with water resistance and light absorption properties.

9. The light source module according to claim 8, wherein the material of the first waterproof layer comprises polyethylene terephthalate.

* * * * *